United States Patent
Naito et al.

(10) Patent No.: US 6,663,165 B2
(45) Date of Patent: Dec. 16, 2003

(54) METHOD FOR ATTACHING DOOR PARTS AND UNIFIED PARTS OF AUTOMOBILE DOOR

(75) Inventors: Makoto Naito, Hiroshima (JP); Mitsuaki Arata, Hiroshima (JP); Hitoshi Hamanaka, Hiroshima (JP)

(73) Assignee: Nishikawa Rubber Co., Ltd., Hiroshima (JP)

( * ) Notice: Subject to any disclaimer, the term of this patent is extended or adjusted under 35 U.S.C. 154(b) by 0 days.

(21) Appl. No.: 10/265,796

(22) Filed: Oct. 7, 2002

(65) Prior Publication Data

US 2003/0168882 A1 Sep. 11, 2003

(30) Foreign Application Priority Data

Mar. 8, 2002 (JP) ........................ 2002-064315

(51) Int. Cl.$^7$ ............... B60J 10/02; B60J 1/08
(52) U.S. Cl. .................. 296/146.2; 219/428
(58) Field of Search ............ 296/146.1, 146.2, 296/146.9; 49/475.1, 482.1, 492.1, 493.1, 495.1, 500.1; 29/428

(56) References Cited

U.S. PATENT DOCUMENTS

| | | | | |
|---|---|---|---|---|
| 4,908,989 | A | * | 3/1990 | Omura et al. ............ 49/502 |
| 5,557,890 | A | | 9/1996 | Levy et al. |
| 5,746,471 | A | * | 5/1998 | Teramoto et al. ........ 296/146.1 |
| 6,409,251 | B1 | * | 6/2002 | Kaye et al. ............ 296/146.9 |
| 2001/0002520 | A1 | * | 6/2001 | Lim ..................... 296/146.2 |
| 2002/0003356 | A1 | | 1/2002 | Davis et al. |

FOREIGN PATENT DOCUMENTS

| | | | |
|---|---|---|---|
| GB | 2286416 A | | 8/1995 |
| GB | 2302558 | * | 1/1997 |
| JP | 2-6219 | * | 1/1990 |
| JP | 6-106973 | * | 4/1994 ............ 296/146.2 |
| JP | 6-106992 | * | 4/1994 ............ 296/146.2 |
| JP | 7-5025 | | 1/1995 |
| JP | 9-71184 | * | 3/1997 |
| JP | 9-76883 | * | 3/1997 |
| JP | 9-277823 | * | 10/1997 |
| JP | 11-59186 | * | 3/1999 |
| JP | 2001-71752 | * | 3/2001 |

* cited by examiner

*Primary Examiner*—Stephen T. Gordon
*Assistant Examiner*—H. Gutman
(74) *Attorney, Agent, or Firm*—Frishauf, Holtz, Goodman & Chick, P.C.

(57) ABSTRACT

A method is provided for attaching door parts of an automobile door equipped with a door glass and a quarter glass. The method includes the steps of: (i) attaching a lower-bar of a division bar inside a door panel, where the division bar includes the lower-bar and an upper-bar separated from and positioned above the lower-bar for installation between the door glass and the quarter glass; (ii) attaching a glass seal of unified parts to a periphery of the quarter glass to form a quarter part, where the unified parts are formed by integrally molding the upper-bar made of resin, a glass seal and a glass run for sealing the door glass; (iii) attaching a center pillar side of the glass run to a door frame; (iv) attaching the door glass to the door panel with support of the lower-bar; (v) connecting a bottom end of the upper-bar to a top end of the lower-bar; and (vi) attaching the quarter part and a remaining portion of the glass run to corresponding portions.

8 Claims, 6 Drawing Sheets

METHOD FOR ATTACHING DOOR PARTS AND UNIFIED PARTS OF AUTOMOBILE DOOR

BACKGROUND OF THE INVENTION

1. Field of the Invention

This invention relates to a method for attaching door parts and unified parts used in the method, where the door parts including a door glass, quarter glass and a division bar are attached to an automobile door equipped with a door glass (rear glass or front glass) and a quarter glass (a triangular-shaped glass).

2. Description of the Prior Art

Figure 8:
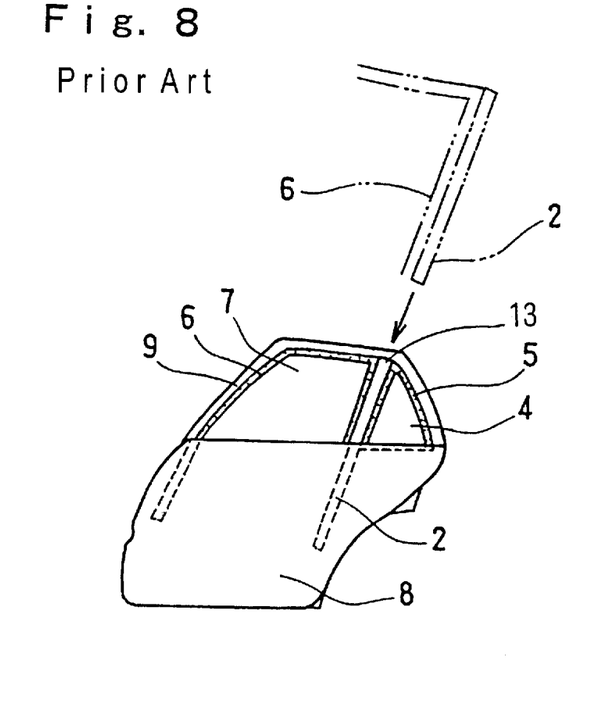
FIG. 8 is a diagram showing a method for attaching door parts as a conventional example.

Conventionally, as shown in FIG. 8, in an automobile door equipped with a door glass (rear glass or front glass) 7 and a quarter glass 4, a division bar 2 is installed between the door glass 7 and the quarter glass 4 subsequent to an attachment of a glass run 6 to one side of the division bar 2. This is because if the division bar 2 is installed prior to the quarter glass 4, the quarter glass 4 cannot be installed.

That is, the conventional method for attaching the door parts is such that, at first, the quarter glass 4 (comprised with a glass seal around its periphery) is installed. Then, the glass run 6 is attached from the center pillar side toward the roof side of an automobile. Subsequently, after attaching the glass run 6 to one side of the division bar 2, the division bar 2 is attached to the quarter glass 4. Finally, the roof side of the glass run 6 is attached.

However, the conventional method required skill and time and had poor workability of installation, since the division bar 2 needed to be inserted in the narrow gap between the quarter glass 4 and the door glass 7 from the top and needed to be installed to the door panel 8. Further, at the time of the installation, the tip of the division bar 2 contacted the door panel 8, thereby damaging the paint of the door panel 8, which became a cause of degraded appearance and the generation of rust.

Furthermore, the glass run 6 needed to be attached to one side of the division bar 2 in advance. In this installation process, both the glass run 6 and the division bar 2 were in a free position, therefore there was difficulty in completing the process. This was another drawback concerning the workability of installation. Moreover, since the glass run 6 and the glass seal 5 were individual moldings, there developed a level difference 13 between both parts, causing a degraded appearance.

Japanese patent publication No. 7-5025 discloses a structure in FIG. 4(c), where the vent assembly body (5) equipped with the division bar (1) is attached to the door (D). However, in this structure, there is no member which carries out temporary support of the front end of the door glass (3) at the time of installation of the door glass (3). And, there still remains the problem that a level difference is developed, degrading an appearance of the door and an automobile.

Therefore, an object of this invention is to provide a method for attaching door parts of an automobile door which has excellent workability of installation and which enables the door parts to be attached without damaging the paint of a door frame. Another object of this invention is to provide unified parts of an automobile door which are excellent in installation workability and which do not damage the paint of a door frame.

SUMMARY OF THE INVENTION

In order to attain the above-mentioned object, there is provided a first aspect of the invention which provides a method for attaching door parts of an automobile door equipped with a door glass (7) and a quarter glass (4), which comprises the following steps. A lower-bar (2b) of a division bar (2) is attached inside a door panel (8). The division bar (2) comprises the lower-bar (2b) and an upper-bar (2a) which is separated from and positioned above the lower-bar (2b) and is installed between the door glass (7) and the quarter glass (4). A glass seal (5) of unified parts (1) is attached to the periphery of a quarter glass (4), forming a quarter part (3). The unified parts (1) is formed by integrally molding the upper-bar (2a) made of resin, a glass seal (5) and a glass run (6) for sealing the door glass (7). The center pillar side of the glass run (6) is attached to a door frame (9). The door glass (7) is attached to the door panel (8) with a support of the lower-bar (2b). The bottom end of the upper-bar (2a) is connected to the top end of the lower-bar (2b). The quarter part (3) and the remaining portion of the glass run (6) is attached to corresponding portions, respectively.

A second aspect of the invention provides unified parts (1) of an automobile door equipped with a door glass (7) and a quarter glass (4). A division bar (2) made of resin consists of an upper-bar (2a) and a lower bar separately positioned up and down. The upper-bar (2a) is installed between the door glass (7) and the quarter glass (4), and the lower-bar (2b) is attached inside a door panel (8). The upper-bar (2a) is integrally molded with a glass seal (5) for sealing the quarter glass (4) and a glass run (6) for sealing the door glass (7). A quarter part (3) is formed by attaching the glass seal (5) to the periphery of the quarter glass (4). The center pillar side of the glass run (6) is attached to a door frame (9) subsequent to an attachment of the lower bar. The bottom end of the upper-bar (2a) is connected to the top end of the lower-bar (2b), after the door glass (7) is attached with a support of the lower-bar (2b). And, the quarter part (3) and the remaining portion of the glass run (6) is attached to the corresponding portions, respectively.

A third aspect of the invention which provides unified parts (1) of an automobile door equipped with a door glass (7) and a quarter glass (4). A division bar (2) made of resin consists of an upper-bar (2a) and a lower bar separately positioned up and down. The upper-bar (2a) is installed between the door glass (7) and the quarter glass (4). The lower-bar (2b) is installed inside a door panel (8). The upper-bar (2a) is integrally molded with a glass seal (5) for the quarter glass (4). A glass run (6) for the door glass (7) is connected to the unified upper-bar (2a) and the glass seal (5) with a hook (11, 12) from the inside or outside the automobile. A quarter part (3) is formed by attaching the glass seal (5) to the periphery of the quarter glass (4). The center pillar side of the glass run (6) is attached to a door frame (9) subsequent to an attachment of the lower bar. The bottom end of the upper-bar (2a) is connected to the top end of the lower-bar (2b) after the door glass (7) is attached with a support of the lower-bar (2b). And, the quarter part (3) and the remaining portion of the glass run (6) is attached to the corresponding positions, respectively.

A fourth aspect of the invention provides unified parts (1) of an automobile door, wherein the glass run (6) is integrally molded with the upper-bar (2a) in the third aspect of the invention.

A fifth aspect of the invention provides unified parts (1) of an automobile door, wherein the outside or the inside of the hook (11, 12) is decorated in the third or the fourth aspect of the invention.

As used herein, door glass includes both a rear glass and a front glass, and quarter glass refers to a triangular-shaped glass attached in a vent. The numerals in parentheses indicate the corresponding elements or corresponding matters indicated in the drawings and the below described preferred example of the invention.

According to the first aspect of the invention (a method for attaching door parts of an automobile door), the door parts are installed in the following manner: the lower-bar of the division bar is installed; the glass seal among the unified parts is attached to the quarter glass; the center pillar side of the glass run is attached to the door frame; the door glass is attached; the bottom end of the upper-bar is connected to the top end of the lower-bar; and the quarter part and the remaining portion of the glass run is attached. Therefore, unlike as in the prior art, it is not necessary to insert the division bar in the narrow gap between the door glass and the quarter glass.

Thus, it is easy to attach the door parts to an automobile door without skill, so that the workability of installation improves. Further, during the installation process, such incident can be avoided that the tip end of the division bar makes contact with the door panel damaging the paint thereof. Therefore, degradation of appearance and development of rust can be prevented. Furthermore, the door glass is attached subsequent to the attachment of the lower-bar of the division bar, so that a temporary support of the door glass can be carried out with the lower bar. Therefore, it is not necessary to manually hold the door glass during the installation, so that the workability of installation improves.

Moreover, the upper-bar and the glass seal are integrally molded, so that it can prevent a development of a level difference between both parts, and the appearance of the door improves. Further, since the parts are attached collectively, the installation process can be attained with less man-hours.

According to a second aspect of the invention (unified parts of an automobile door), the unified parts comprise a division bar made of resin consisting of an upper-bar and a lower bar separately positioned up and down. The upper-bar is installed between the door glass and the quarter glass, whereas the lower-bar is attached inside the door panel. The upper-bar is integrally molded with a glass seal for the quarter glass and a glass run for the door glass. The quarter part is formed by attaching the glass seal to the periphery of the quarter glass. The center pillar side of the glass run is attached to the door frame subsequent to an attachment of the lower bar. The bottom end of the upper-bar is connected to the top end of the lower-bar, after the door glass is attached with a support of the lower-bar. The quarter part and the remaining portion of the glass run is attached to the corresponding portions.

Therefore, it is easy to attach the door parts including the unified parts to an automobile door, so that the workability of installation improves. Further, at the time of the installation process, such incident can be avoided that the tip end of the division bar makes contact with the door panel, thereby damaging the paint thereof.

Moreover, the unified parts are structured integrally composing the upper-bar, the quarter part (a combination of the quarter glass and the glass seal) and the glass run, so that they can be handled as one part, and so that man-hours of installation can be lessened.

According to a third aspect of the invention the glass run is connected to the integrally molded parts of the upper-bar and the glass seal, so that various ornaments can be provided to both inside and outside of an automobile.

According to the fourth aspect of the invention, the glass run is integrally molded with the upper end of the upper-bar, so that it can prevent development of a level difference between both parts.

DESCRIPTION OF PREFERRED EMBODIMENT

Figure 2:
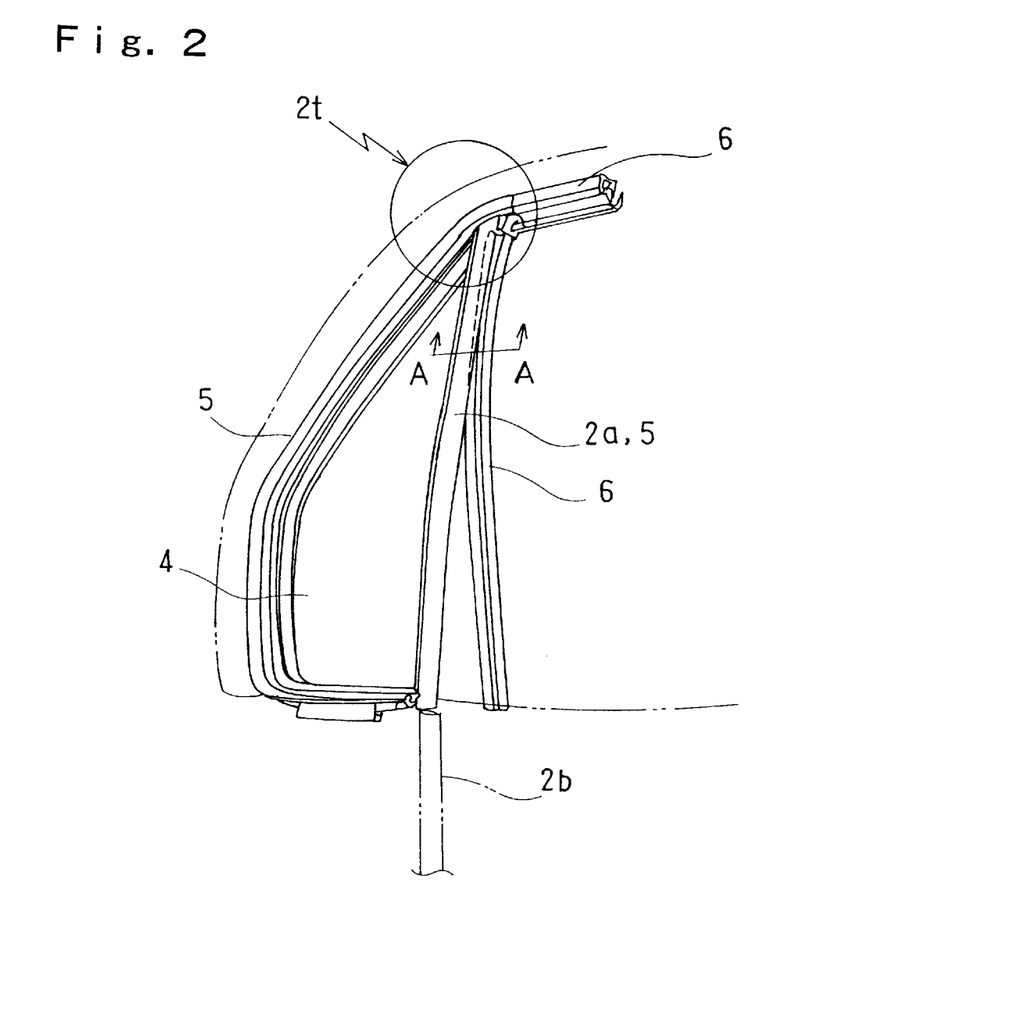
FIG. 2 is a perspective view showing the principal part of unified parts according to the preferred embodiment of the present invention.
Figure 3:
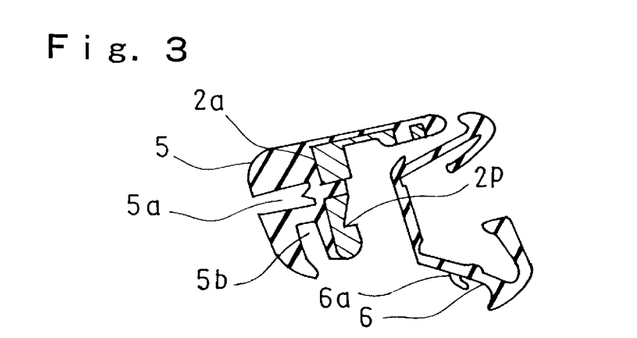
FIG. 3 is an expanded sectional view along line A—A FIG. 2.

A preferred embodiment of a method for attaching door parts according to the present invention will be described hereinafter, referring to FIGS. 1 to 3.

Figure 1:
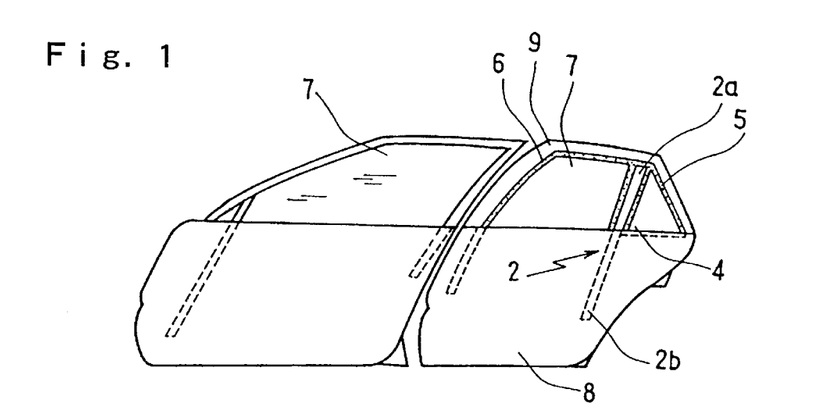
FIG. 1 is an elevation view showing a door where unified parts according to a preferred embodiment of the present invention are installed.

FIG. 1 is an elevation view showing a door where unified parts of an automobile door according to the present invention are attached. FIG. 2 is a perspective view showing the principal part of the unified parts of an automobile door according to the present invention. FIG. 3 is an enlarged vertical view along line A—A in FIG. 2. Although the quarter part 3 shown in FIG. 2 is somewhat dissimilar in shape from the one shown in FIG. 1, the fundamental compositions are identical. The identical numerals are given to parts similar to ones in the conventional example.

Figure 4:
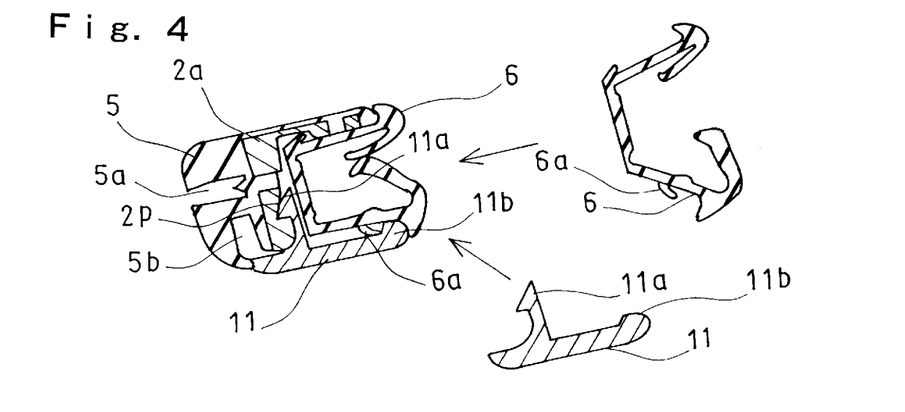
FIG. 4 is a sectional view showing the glass run illustrated in FIG. 3 being unified with a hook 11.

A preferred embodiment of unified parts of automobile door 1 according to the present invention is installed to a door of an automobile equipped with a door glass (rear glass) 7 and a quarter glass 4. The unified parts 1 comprise a division bar 2. The division bar 2 is divided into an upper-bar 2a and a lower-bar 2b, and the upper-bar 2a is installed between a door glass 7 and a quarter glass 4, whereas the lower-bar 2b is attached inside a door panel 8. At least the upper-bar 2a is made of resin (and the lower-bar 2b can also be made with resin). The upper-bar 2a is integrally molded in advance with a glass seal 5 which is attached to the entire periphery of a quarter glass 4. Further, as shown in FIG. 4, a glass run 6 for receiving a door glass 7 is attached to the integrally molded parts with a hook 11. The quarter glass 4 is inserted in the groove 5a formed in the glass seal 5.

Further, the glass run 6 is also integrally molded with the top end 2t of the upper-bar 2a to which the glass seal 5 is integrally molded, thereby preventing a development of a level difference between the upper-bar 2a and the glass run 6.

The hook 11 is provided with a hook-shaped convex 11a at the outside thereof, and is also provided with a bulge 11b at the end of the glass run side (the right-hand side in FIG. 4). When the glass run 6 is attached to the unified structure of the upper-bar 2a and the glass seal 5, the convex 11a fits into a concave 2p formed in the upper-bar 2a, while the bulge lib is caught by a projection 6a formed at the side wall of the glass run 6.

Further, at the inner side of the hook 11, there is provided a decoration with color material, cloth, feathering and the like, which is harmonized with the interior of the automobile, making a great-looking layout.

Figure 5:
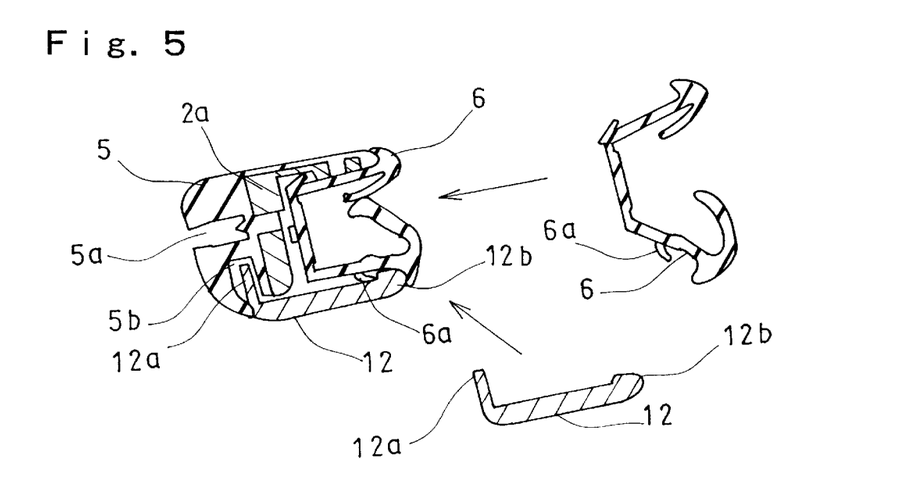
FIG. 5 is a sectional view showing the glass run illustrated in FIG. 3 being unified with a hook 12.

The hook 11 is not limited in its shape like the one shown in FIG. 4, and such a hook 12 having about a L-shaped form in section may be used. When the glass run 6 is attached to the hook 12, the L-shaped end 12a thereof fits into a concave 5B formed inner side of the glass seal 5, while the bulge 12b engages with the projection 6a formed at the side wall of the glass run 6.

The unified parts of an automobile door comprise a quarter part 3 which is formed by attaching the glass seal 5 to the periphery of a quarter glass 4. In such structure, the center pillar side of the glass run 6 is attached to the door frame 9 subsequent to an installation of the lower-bar. The door glass 7 is attached with a support of the lower-bar 2b, then the bottom end of the upper-bar 2a is connected to the top end of the lower-bar 2b, subsequently, the quarter part 3 is attached to the door frame 9, and the rest portion of the glass run 6 is attached to the roof side of the automobile.

Through use of the unified parts 1 according to the preferred embodiment, it is not necessary to insert the division bar 2 into the narrow gap formed between the door glass 7 and the quarter glass 4, so that the workability of installation improves. Further, such incident can be avoided that the tip of the division bar 2 makes contact with the door panel 8, thereby damaging the paint thereof at the time of installation.

Furthermore, since the upper-bar 2a is integrally molded with the glass seal 5, there is provided no level difference between both parts, thereby making a great-looking layout. Moreover, integrally formed parts can be easily manufactured, therefore, number of parts can be decreased.

Referring to FIG. 6, a method for attaching door parts of an automobile door with above-mentioned unified parts will be described hereinafter. The automobile is equipped with a door glass (rear glass) 7 for a rear door and a triangular-shaped quarter glass 4 for a vent window.

Figure 6A:
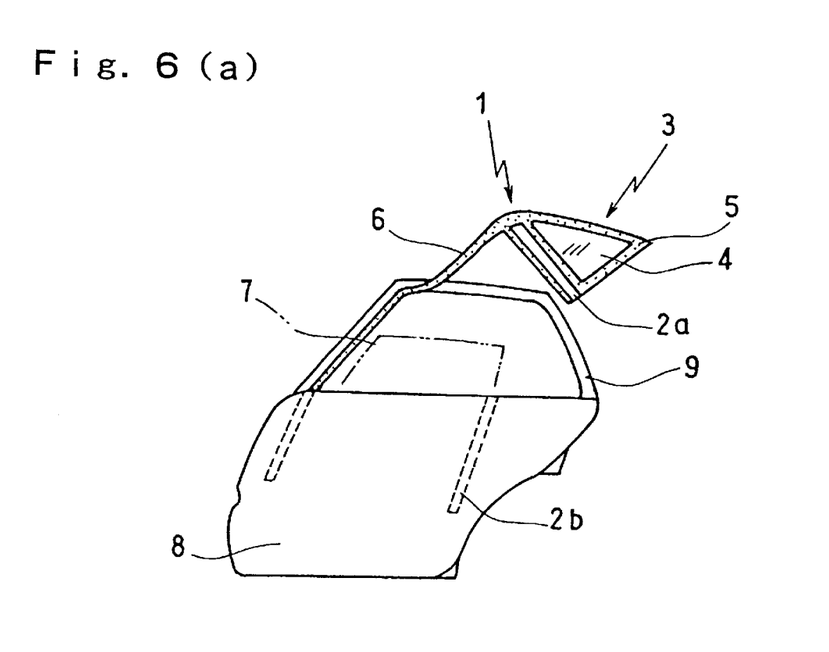
FIG. 6 is a diagram showing a method for attaching door parts of an automobile door according to the preferred embodiment of the present invention, wherein (a) shows the state of attaching the center pillar side of a glass run, and (b) shows the state of attaching the remaining parts of a quarter part and a glass run.

In this method, first of all, the lower-bar 2b of the division bar 2 is installed to the door panel 8 (see FIG. 6(a)). The division bar 2 is composed of the upper-bar 2a and the lower-bar 2b, which are separately formed and are positioned up and down. The upper-bar 2a is to be installed between the door glass 7 and the quarter glass 4, and the lower-bar is to be installed to the door panel 8.

Then, the upper-bar 2a, which is made of resin and is integrally molded with a glass seal 5, is attached to a glass run 6 with a hook 11 or 12. Subsequently, the glass seal 5 is attached to the periphery of the quarter glass 4, forming a quarter part 3. Then, the center pillar side of the glass run 6 (the left-hand side in FIG. 6) is attached to the door frame 9.

Subsequently, the door glass 7 is installed. In this process, the center pillar side edge of the door glass 7 (the left-hand side in FIG. 6) is supported by the door frame 9 as it is inserted in the door frame 9, while the opposite side of the door glass 7 (the right-hand side in FIG. 6) is supported by the lower-bar 2b as it is inserted in the lower-bar 2b.

Figure 6B:
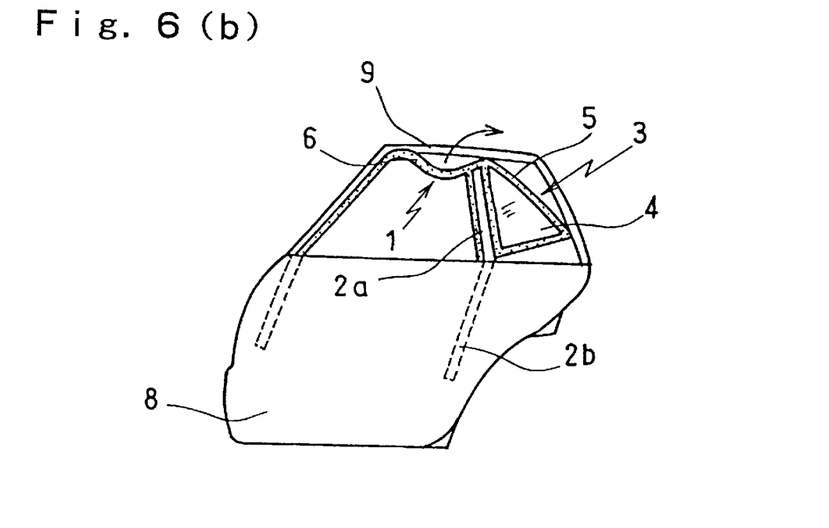

Finally, the bottom end of the upper-bar 2a is connected to the top end of the lower-bar 2b, and the quarter part 3 is rotated in the direction illustrated with the arrow in order to secure to the door frame 9, then, the remaining portion of the glass run 6 is attached to the roof side of the automobile (see FIG. 6 (b)).

Although, in the above-mentioned method, the quarter part 3 is attached to the door frame 9 with a rotational movement, the quarter part 3 can be attached without such movement if, as shown in FIG. 7, the hook 11 or 12 is applied instead. Further, by using the hook 11 or 12, it is easy to attach a smaller size of quarter part 3, which is usually difficult to install.

Figure 7A:
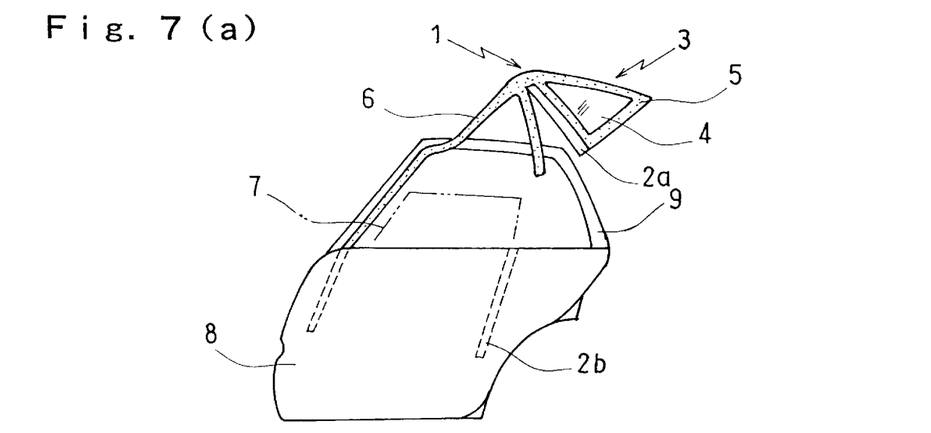
FIG. 7 is a diagram showing another method according to the preferred embodiment of the present invention, wherein (a) shows the state of attaching the center pillar side of a glass run, (b) shows the state of attaching a quarter part and (c) shows the state of attaching a hook to an upper-bar.

A method of attachment using the hook 11 or 12 will be described below referring to FIG. 7 (a). First, the lower-bar 2b is installed to the door panel 8. Then, the glass seal 5, which is integrally molded with the upper-bar 2a with or without the glass run 6, is attached to the periphery of the quarter glass 4, forming a quarter part 3. Subsequently, the center pillar side of the glass run (the left-hand side in FIG. 7) is attached to the door frame 9.

Then, the door glass 7 is installed. In this process, the center pillar side edge of the door glass 7 (the left-hand side in FIG. 6) is supported by the door frame 9 as it is inserted in the door frame 9, while the opposite side of the door glass 7 (the right-hand side in FIG. 6) is supported by the lower-bar 2b as it is inserted in the lower-bar 2b.

Figure 7B:
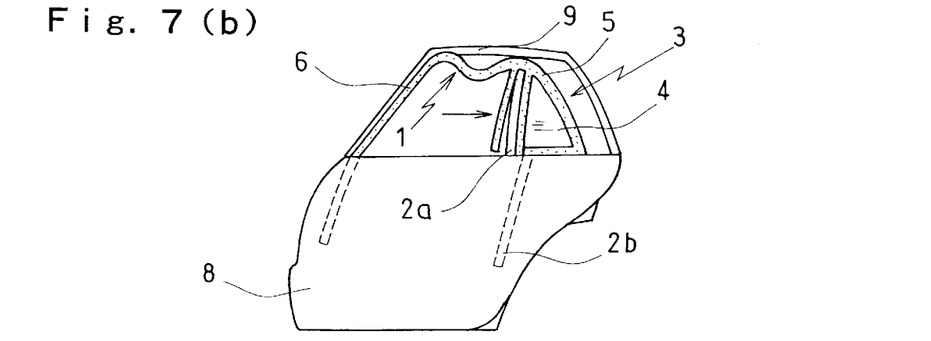
Figure 7C:
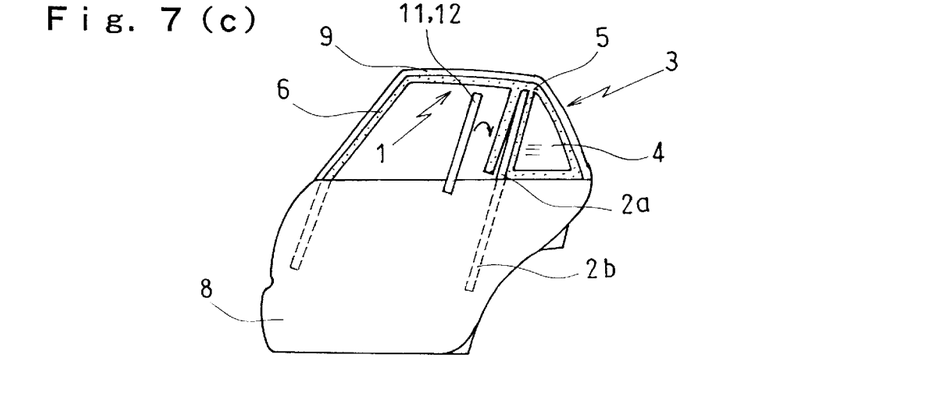

Subsequently, as shown in FIG. 7(b), after positioning the bottom end of the upper-bar 2a over the top end of the lower-bar 2b, the quarter part 3 is slid in the horizontal direction, thereby attaching the quarter part 3 to the door frame 9. Then, the remaining portion of the glass run 6 is attached to the roof side of the automobile. And, finally, the hook 11 or 12 is applied as shown in FIG. 7(c).

According to the method described above, it is not necessary to insert the division bar 2 into the narrow gap provided between the door glass 7 and the quarter glass 4, so that an attachment of the door parts can be easily attained.

Further, such incident can be avoided that while the division bar 2 is installed, the tip thereof makes contact with the door panel 8, thereby damaging the paint of the panel 8. Therefore, degradation of appearance and development of rust can be prevented. Furthermore, the door glass 7 can be temporarily supported by the lower-bar 2b, so that it is not necessary to manually hold the door glass 7 during the installation operation, and the workability of installation improves. Moreover, since the upper-bar 2a and the glass seal 5 are integrally molded, a level difference 13 does not appear between both parts 2a, 5, unlike the conventional example (FIG. 8). Thus, an outlook of the door and the automobile improves.

The above-described embodiment comprises such structure that the glass run 6 is connected to the integrally molded upper-bar 2a and the glass seal 5 with the hook 11 or 12. Instead of such structure, the three parts, the upper-bar 2a, the glass seal 5 and the glass run 6 can be integrally molded.

Further, the hook 11 or 12 in the embodiment is illustrated and explained only in the case it is attached from inside the automobile, but it may be such a structure that it is attached from outside the automobile (illustration abbreviated).

Furthermore, although the door glass 7 is explained with respect to the case of a rear glass, this invention can be applied to a door where a front glass and a quarter glass are equipped adjacently.

According to the method of the present invention for attaching door parts of an automobile door, unlike as in the conventional art, it is not necessary to insert a division bar into a narrow gap formed between a door glass and a quarter glass.

Therefore, it is easy to attach the door parts to an automobile door without skill, so that the workability of installation improves. Further, during an attachment process, such incident can be avoided that the tip end of a division bar makes contact with a door panel, thereby damaging the paint thereof. Therefore, degradation of appearance and development of rust can be prevented. Furthermore, a door glass is installed subsequent to an attachment of the lower-bar of a division bar, so that the door glass can be temporarily supported by the lower bar during the installation. Therefore, it is not necessary to manually hold the door glass, and the workability of installation improves.

Moreover, the upper-bar and a glass seal are integrally molded, so that a development of a level difference between both parts can be prevented, and that an appearance of the door improves. Further, since parts are installed collectively, an attachment process can be attained with less man-hours.

According to the unified parts of the present invention, it is not necessary to insert a division bar into a narrow gap created between a door glass and a quarter glass. Therefore, it is easy to attach door parts including unified parts to an automobile door, so that the workability of installation improves. Further, at the time of an attachment process, such incident can be avoided that the tip end of a division bar makes a contact with a door panel, thereby damaging the paint thereof.

Moreover, the unified parts of the present invention are structured integrally, and comprise an upper-bar, a quarter part (a combination of a quarter glass and a glass seal) and a glass run, so that it can be handled as one part, so that man-hours of installation can be reduced.

Also according to the present invention, a glass run is connected to a integrally molded parts of an upper-bar and a glass seal, so that various ornaments can be provided both inside and outside of an automobile.

And also according to the present invention, a glass run is integrally molded with the upper end of an upper-bar, so that it can prevent development of a level difference between both parts.

What is claimed is:

1. A method for attaching door parts of an automobile door equipped with a door glass and a quarter glass, comprising:

attaching a lower-bar of a division bar inside a door panel, said division bar comprising said lower-bar and an upper-bar which is separated from and positioned above the lower-bar and which is installed between the door glass and the quarter glass;

attaching a glass seal to a periphery of the quarter glass to form a quarter part; forming unified parts by integrally molding the upper-bar made of resin, the glass seal and a glass run for sealing the door glass;

attaching a center pillar side of the glass run to a door frame;

attaching the door glass to the door panel the lower bar supporting the door glass;

connecting a bottom end of the upper-bar to a top end of the lower-bar; and attaching the quarter part and a remaining portion of the glass run to corresponding portions of the automobile door.

2. Unified parts for an automobile door equipped with a door glass and a quarter glass, said unified parts comprising:

a division bar made of resin and including an upper-bar and a lower bar which are separately positioned, said upper-bar being adapted to be installed between the door glass and the quarter glass, said lower-bar being adapted to be attached inside a door panel, and said upper-bar being integrally molded with a glass seal for the quarter glass and a glass run for the door glass, wherein:

a quarter part is formed by attaching the glass seal to a periphery of the quarter glass;

a center pillar side of the glass run is adapted to be attached to a door frame subsequent to attachment of the lower bar inside the door panel;

a bottom end of the upper-bar is adapted to be connected to a top end of the lower-bar after the door glass is attached with the lower bar supporting the door glass; and the quarter part and a remaining portion of the glass run are adapted to be attached to corresponding portions of the automobile door.

3. Unified parts for an automobile door equipped with a door glass and a quarter glass, said unified parts comprising:

a division bar made of resin and including an upper-bar and a lower bar which are separately positioned, said upper-bar being adapted to be installed between the door glass and the quarter glass, said lower-bar being adapted to be attached inside a door panel, and said upper-bar being integrally molded with a glass seal for the quarter glass; and a glass run for the door glass connected to the integrally molded upper-bar and glass seal with a hook, wherein:

a quarter part is formed by attaching the glass seal to a periphery of the quarter glass;

a center pillar side of the glass run is adapted to be attached to a door frame subsequent to attachment of the lower bar inside the door panel;

a bottom end of the upper-bar is adapted to be connected to a top end of the lower-bar after the door glass is attached with the lower bar supporting the door glass; and the quarter part and a remaining portion of the glass run are adapted to be attached to corresponding portions of the automobile door.

4. Unified parts of an automobile door as claimed in claim 3, wherein the glass run is integrally molded with the upper-bar.

5. Unified parts of an automobile door claimed in 3, wherein an outside portion of the hook is decorated.

6. Unified parts of an automobile door as claimed in claim 4, wherein an outside portion of the hook is decorated.

7. Unified parts of an automobile doors as claimed in claim 3, wherein an inside portion of the hook is decorated.

8. Unified parts of an automobile doors as claimed in claim 4, wherein an inside portion of the hook is decorated.

* * * * *